United States Patent
McMahan et al.

(10) Patent No.: US 7,203,159 B2
(45) Date of Patent: Apr. 10, 2007

(54) LINE CARD-SOURCED ESF FRAMING PROTECTION SWITCH FDL SIGNALING

(75) Inventors: Dennis B. McMahan, Huntsville, AL (US); Bradley D. Tidwell, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 1002 days.

(21) Appl. No.: 10/167,012

(22) Filed: Jun. 11, 2002

(65) Prior Publication Data

US 2003/0227868 A1  Dec. 11, 2003

(51) Int. Cl.
*G01R 31/08*  (2006.01)

(52) U.S. Cl. .................. 370/216; 370/522; 370/228; 370/465

(58) Field of Classification Search .............. None
See application file for complete search history.

(56) References Cited

U.S. PATENT DOCUMENTS

| | | | | | |
|---|---|---|---|---|---|
| 5,224,108 | A | * | 6/1993 | McDysan et al. | 370/522 |
| 5,506,956 | A | * | 4/1996 | Cohen | 714/6 |
| 5,513,173 | A | * | 4/1996 | Machemer et al. | 370/252 |
| 5,566,161 | A | * | 10/1996 | Hartmann et al. | 370/249 |
| 5,577,196 | A | * | 11/1996 | Peer | 714/4 |

* cited by examiner

*Primary Examiner*—Duc Ho
(74) *Attorney, Agent, or Firm*—Allen, Dyer, Doppelt, Milbrath & Gilchrist, P.A.

(57) ABSTRACT

A back-up channel line card-installed ESF framing mechanism independently sources an FDL signaling channel for the transport of protection switch signaling information, taking advantage of the fact that DSL multiplexer equipment is capable of accepting and processing ESF framed digital data, including embedded FDL-based signaling information. Upon completion of transport of the FDL-based signaling information, the back-up channel is used for data transport in place of a faulty channel.

17 Claims, 1 Drawing Sheet

LINE CARD-SOURCED ESF FRAMING PROTECTION SWITCH FDL SIGNALING

FIELD OF THE INVENTION

The present invention relates in general to communication systems and subsystems therefor, and is particularly directed to a line card-installed ESF framing mechanism for protection switch FDL signaling, that takes advantage of the capability of downstream (remote site) DSL multiplexer equipment to accept and process ESF framed digital data, including embedded FDL-based signaling information. In response to a need to substitute the standby channel for a faulty main channel, the protection channel line card's ESF framing mechanism is activated to transport signaling information for substitution of the protection channel. Upon completion of transport of the signaling information, the back-up channel is used for data transport in place of the faulty channel.

BACKGROUND OF THE INVENTION

Telecommunication channels, such as but not limited to metallic (copper) wirelines, used for the transport of digital subscriber loop service, are sometimes supported by one or more back-up or standby channels, through which an interruption in service due to a failure or fault (e.g., an excessive number of errored seconds) in an active channel can be restored. For efficient use of the available wireline channels, the usual practice is to have a plurality of main channels backed-up by a single standby channel. In order to avoid having to immediately dispatch service personnel to investigate the faulty channel and manually switch in the standby circuit, it is customary practice to employ a protection switching scheme, which is automatically operated by a supervisory fault-monitoring mechanism, to substitute the back-up channel for the faulty channel. Moreover, to ensure that the protected data channel is properly routed at both ends of the replaced transport path, signaling for controlling the operation of the protection switch must occur between each end of the circuit. One way to accomplish this is to employ some form of in-band coding. Unfortunately, such an approach is relatively slow and requires a special processing function to decode the signaling.

Some data channels carry an embedded overhead channel, that may be used to send performance monitoring messages or alarm signaling between termination equipment. As a non-limiting example, a DS1 data channel framed with extended super frame (ESF) framing has a 4 kbps overhead channel, known as facility data link (FDL). This auxiliary channel provides a relatively fast and robust mechanism for conveying protection switch signaling information between the circuit termination equipments, to control operation of the protection switch for substituting the standby channel for the faulty channel (or switching the main channel back in service upon clearing of the fault). Unfortunately, because ESF framed data does not necessarily exist in the payload data carried by main and standby channels being transported over currently deployed digital telecommunication (e.g., DS1) equipment, it cannot be relied upon to provide protection switching signaling.

SUMMARY OF THE INVENTION

In accordance with the present invention, this lack of certainty as to availability of an overhead channel, such as the above-referenced ESF FDL channel, within the framing structure of data being transported over a communication channel of a multi-channel digital telecommunication network, is readily obviated by independently sourcing ESF framing in the central office line card serving the standby channel, and thereby take advantage of the capability of the network's DSL multiplexer equipment to accept and process ESF framed digital data, including embedded FDL-based protection switch signaling information.

This independent source of ESF framing is readily implemented by a modification of the standby channel line card's circuitry and an associated augmentation of the multiplexer's protection switch control software. Within the standby channel line card, the DS1 payload transport path is modified to include a controlled switch. This switch provides signaling connectivity between either a stand-alone ESF FDL-based signaling unit or a protected DS1 payload input and the standby channel.

The ESF FDL-based signaling unit has an idle signal generator coupled to a standard ESF framing generator. The output of the ESF framing generator is coupled to an FDL insertion multiplexer, which provides for the insertion of a 4 kbps (FDL) overhead channel. The FDL insertion multiplexer is coupled to receive protection switch signaling information from a microcontroller that controls the operation of the multichannel multiplexer.

In the absence of a condition mandating substitution of the standby DS1 channel for any of the principal DS1 channels, the controlled switch is in its (default) standby state. In this state, the controlled switch provides signaling connectivity between the ESF FDL-based signaling unit and the standby channel. During this quiescent mode, the FDL insertion unit is idle. In response to a need to substitute the standby channel for a faulty main channel, signaling information associated with the substitution of the protection channel is inserted into the FDL channel of the ESF framed output of the ESF generator.

With the switch in its default state, the auxiliary ESF frame is coupled over the standby channel to the ESF FDL receiver in the channel multiplexer at the remote site. Once this signaling information has been acknowledged by the remote site multiplexer, the remote site controller switches the path for the faulty DS1 circuit to the protection channel. The central office multiplexer's control processor then switches the path for the protected DS1 data to the transport path through the line card for the back-up circuit, so that the protected DS1 data may be transported over the back-up circuit.

Upon restoration of the main DS1 circuit that has been taken out of service, the protected DS1 channel is switched back to the restored circuit, and the switch is returned to its default state. Signaling information associated with the substitution of the main channel for the protection channel is inserted into the FDL channel of the ESF frame for transport over the back-up channel, instructing the remote site multiplexer to switch back to the restored main DS1 channel. Once the channel restoration operation is complete, the back-up channel is returned to quiescent mode.

DETAILED DESCRIPTION

Figure 1:
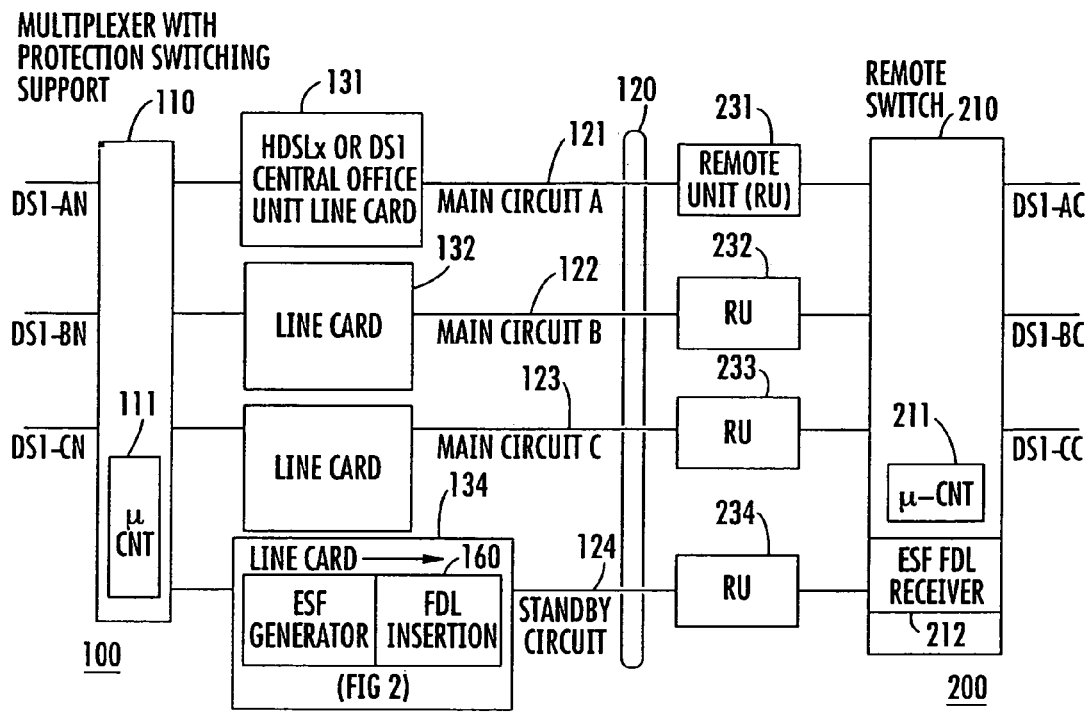
FIG. 1 is a reduced complexity diagram of the general architecture of a digital communication system employing the ESF FDL sourcing line card for the standby channel in accordance with the invention.

Before detailing the line card-installed ESF framing mechanism for protection switch FDL signaling in accordance with the present invention, it should be observed that the invention resides primarily in a prescribed arrangement of conventional communication subsystem components and attendant supervisory communications microprocessor circuitry and application software therefor, that controls the operations of such components. In a practical implementation that facilitates their incorporation into readily commercially available telecommunication transceiver equipment (such as that which may be installed at a central office), the inventive arrangement may be readily implemented using field programmable gate array (FPGA)-configured, application specific integrated circuit (ASIC) chip sets. In terms of a practical hardware implementation of such chip sets, digital ASICs are preferred.

Consequently, the configuration of such subsystems and components and the manner in which they may be interfaced with a plurality of telecommunication links (e.g., HDSLx, DS1 links, and the like) have, for the most part, been shown in the drawings by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the major components of the invention in convenient functional groupings, whereby the present invention may be more readily understood.

Attention is now directed to FIG. 1, which is a reduced complexity diagram of the general architecture of a digital communication system in which the present invention may be employed. For purposes of providing a non-limiting example, the digital transport channels will be assumed to be DS1 channels. It is to be understood, however, that the invention may be used with other types of digital communication channels, such as but not limited to DSLx channels. The system is shown in FIG. 1 as comprising a relatively 'west' central office site 100 and a relatively 'east' remote site 200. The 'west' central office site 100 includes a multiplexer 110 that is controllably operative to interface a plurality of upstream digital DS1 communication channels (three: DS1-AN, DS1-BN and DS1-CN, in the reduced complexity example) from the network over principal or main wireline circuits 121, 122 and 123 of a multi-wireline circuit arrangement 120, that also includes a back-up or standby wireline circuit 124. The principal wireline circuits 121, 122 and 123 are respectively terminated at the central office site 100 by conventional DS1 line cards 131, 132 and 133, while the standby wireline circuit 124 is terminated at the central office by an ESF frame-sourcing, augmented line card 134, to be described.

In a complementary manner, at the 'east' remote site 200, the principal wireline circuits 121, 122, 123 and the back-up wireline circuit 124 are terminated by respective DS1 remote units 231, 232, 233 and 234 of conventional construction. These circuits are coupled to a remote multiplexer 210, which interfaces selected ones of the four wireline circuits 121, 122, 123 and 124 with downstream DS1 channels DS1-AC, DS1-BC and DS1-CC that are connected to associated end user or customer premises equipments. In the absence of the substitution of the back-up wireline circuit, remote multiplexer 210 is normally operative to interface wireline circuits 121, 122 and 123 with downstream DS1 channels DS1-AC, DS1-BC and DS1-CC, respectively.

As pointed out previously, although the circuitry within present day multiplexer equipment (including the multiplexer switching equipments shown in FIG. 1) has the capability of accepting and processing ESF framed digital data—including embedded FDL-based signaling information—the actual protocol need not be (although it may be) ESF, and the line cards of the central office equipment are not designed to interface any particular digital framing format, including ESF. As such, unless the DS1 data being transported is already framed using ESF framing, no FDL overhead channel is available for conducting protection switch signaling between the multiplexers terminating the ends of the wireline channels.

Figure 2:
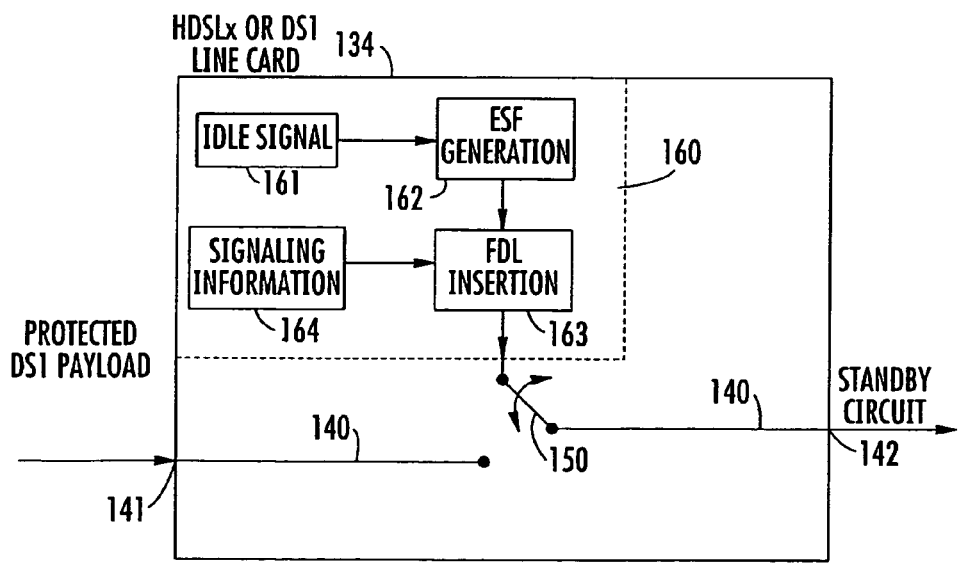
FIG. 2 shows the augmentation of a standby channel line card to provide an independent source of ESF framing format for protection switch signaling.

The present invention overcomes this shortcoming, by augmenting the central office line card 134 at the upstream end of the standby wireline circuit 124 to include a stand-alone source of ESF framing that is independent of the framing format of the DS1 data being protected. In particular, as shown in FIG. 2, the DS1 payload transport path 140 through the back-up channel line card 134 is modified to include a controlled switch 150. (As the circuitry of the line card is otherwise of conventional construction, it has not been shown in FIG. 2, to reduce the complexity of the drawing.)

In its default (standby) state (shown in FIG. 2), switch 150 provides signaling connectivity between an ESF FDL-based signaling unit 160 and the line card's output path terminal 142 coupled to the line card circuitry feeding the standby channel 124. When switched from its default state to its back-up or protection state, switch 150 provides signaling connectivity between an input terminal 141, to which the protected DS1 payload is supplied, and the line card's output path terminal 142, so that the protected DS1 payload may be transported over the standby channel 124.

The ESF FDL-based signaling unit 160 comprises an idle signal generator 161 coupled to a standard ESF framing generator 162. The output of the ESF framing generator 162 is coupled to a multiplexer 163, which provides for the insertion of a 4 kbps (FDL) overhead channel. In the protection switch of the present invention, multiplexer 163 is coupled to receive protection switch signaling information 164 from the communication micro-controller 111 that controls the operation of the multiplexer 110.

In operation, in the absence of a need for substitution of the standby channel 124 for any of the principal channels 121, 122 and 123, the switch 150 is in its default state, shown in FIG. 2, and the idle signal generator 161 is de-asserted. As such, the standby channel 124 is effectively in quiescent mode. In response to a need to substitute the standby channel for a faulty main channel, the control processor 111 within the central office multiplexer 110 enables the idle signal generator 161, the output of which is framed in accordance with ESF framing format and supplied to FDL insertion multiplexer 163. In addition, signaling information 164 associated with the substitution of the protection channel is inserted into the FDL channel of the generated ESF frame.

Since the switch 150 is in its default state, the auxiliary ESF frame generated by the augmented line card 134 is coupled through the switch 150 for transport over the standby channel 124 to the ESF FDL receiver 212 in the downstream multiplexer 210 at the remote site 200. Once this signaling information has been acknowledged by the remote site multiplexer, the remote site controller 211 switches the path for the faulty DS1 circuit to the protection channel 124. The central office multiplexer's control processor 111 then switches the path for the protected DS1 data to the transport path through the line card 134 for the back-up circuit 124. The protected DS1 data is now transported over the back-up circuit 124.

Upon restoration of the main DS1 circuit of interest, the central office multiplexer 110 switches the protected DS1 channel back to the restored circuit, and returns switch 150 to its default state. Signaling information 164 associated with the substitution of the main channel for the protection channel is then inserted into the FDL channel of the newly generated ESF frame for transport over the back-up channel, instructing the remote site multiplexer to switch back to the restored main DS1 channel. Once the restoration switching operation is complete, the back-up channel is returned to quiescent mode.

As will be appreciated from the foregoing description, the lack of certainty as to the availability of an overhead channel, such as an ESF FDL channel, within the data transport protocol of digital telecommunication equipment, to transport protection switch signaling information, is obviated in accordance with the present invention by augmenting the line card for the standby protection channel to independently source a signaling channel employing ESF framing format. As conventional DSL multiplexer equipment has the capability of accepting and processing ESF framed digital data (including embedded FDL-based signaling information), the invention is readily implemented by means of a relatively minor modification of the standby channel line card's circuitry and an associated augmentation of the multiplexer's protection switch control software.

While we have shown and described an embodiment in accordance with the present invention, it is to be understood that the same is not limited thereto but is susceptible to changes and modifications as known to a person skilled in the art; as a consequence, we do not wish to be limited to the details shown and described herein, but intend to cover all such changes and modifications as are obvious to one of ordinary skill in the art.

What is claimed is:

1. A method of controlling participation of a back-up data transport protection channel with respect to a selected one of a plurality of principal data transport channels providing data transport between first and second sites of a telecommunication network, said method comprising the steps of:
   (a) at a back-up channel communication circuit of said first site used for transport of protected data over said back-up channel, independently sourcing a prescribed data transport framing format accepted and processed by communication equipment at said second site; and
   (b) in association with replacement of said selected one of said plurality of principal data transport channels by said back-up channel, transporting protection channel substitution signaling information over said back-up channel using said prescribed data transport framing format as independently sourced in step (a).

2. The method according to claim 1, further including the step of:
   (c) using said backup channel to transport data transport between said first and second sites of said telecommunication network.

3. The method according to claim 1, further including the step of:
   (c) terminating transportation of said protection channel substitution signaling information over said back-up channel in step (b), and substituting said back-up channel in place of said selected one of said plurality of principal data transport channels to transport data transport between said first and second sites of said telecommunication network.

4. The method according to claim 1, wherein said prescribed data transport framing format corresponds to extended super frame (ESF) framing format, and wherein step (b) comprises transporting said protection channel substitution signaling information over a facility data link (FDL) portion of said ESF framing format.

5. The method according to claim 1, wherein
   step (a) comprises providing a switchable communication path through said backup channel communication circuit, controllably generating a digital communication signal having extended super frame (ESF) framing format, and coupling said protection channel substitution signaling information with a facility data link (FDL) portion of said digital communication signal having said ESF framing format, and wherein
   step (b) comprises coupling said digital communication signal having said ESF framing format and containing said protection channel substitution signaling information through said switchable communication path for transportation of said protection channel substitution signaling information over said FDL portion of said ESF framing format.

6. The method according to claim 5, wherein step (a) comprises controllably generating said digital communication signal by selectively generating said digital communication signal having said ESF framing format, in response to need for replacement of said selected one of said plurality of principal data transport channels by said back-up channel.

7. The method according to claim 6, further including the step of:
   (c) controlling said switchable communication path so as to terminate coupling of said digital communication signal having said protection channel substitution signaling information to said back-up channel, and instead coupling said selected one of said plurality of principal data transport channels through said switchable communication path to said backup channel.

8. A backup channel communication circuit for substituting protected data over a backup data transport protection channel in place of a selected one of a plurality of principal data transport channels providing data transport between first and second sites of a communication network arrangement comprising:
   a framing generator that is operative to generate a digital communication signal having a prescribed data transport framing format accepted and processed by communication equipment at said second site; and
   a controlled switching path coupled with said framing generator and being operative, in association with replacement of said selected one of said plurality of principal data transport channels by said backup channel, to couple protection channel substitution signaling information over said backup channel using said prescribed data transport framing format of said digital communication signal generated by said framing generator.

9. The backup channel communication circuit according to claim 8, wherein said controlled switching path is operative, in response to termination of said protection channel substitution signaling information, to couple over said backup channel data that would otherwise be transported over said selected one of said plurality of data transport channels.

10. The back-up channel communication circuit according to claim 8, wherein said prescribed data transport framing format corresponds to extended super frame (ESF) framing format, and wherein said protection channel substitution signaling information is contained within a facility data link (FDL) portion of said ESF framing format.

11. The back-up channel communication circuit according to claim 10, wherein said framing generator is operative to controllably generate said digital communication signal, by selectively generating said digital communication signal having said ESF framing format, in response to need for replacement of said selected one of said plurality of principal data transport channels by said back-up channel.

12. The back-up channel communication circuit according to claim 11, wherein said controlled switching path is operative to terminate coupling of said digital communication signal having said protection channel substitution signaling information to said back-up channel, and couple in its place said selected one of said plurality of principal data transport channels to said backup channel.

13. An arrangement for substituting a back-up data transport protection channel in place of a selected one of a plurality of principal data transport channels providing data transport between first and second sites of a telecommunication network, said arrangement comprising:
a framing generator that is operative to generate a digital communication signal having a prescribed data transport framing format accepted and processed by communication equipment at said second site; and
a back-up channel communication circuit coupled to said framing generator and being operative, in association with replacement of said selected one of said plurality of principal data transport channels by said back-up channel, to couple protection channel substitution signaling information over said back-up channel using said prescribed data transport framing format of said digital communication signal generated by said framing generator.

14. The arrangement according to claim 13, wherein said back-up channel communication circuit includes a controlled switch coupled with said framing generator and being operative, in response to termination of said protection channel substitution signaling information, to couple over said backup channel data that would otherwise be transported over said selected one of said plurality of data transport channels.

15. The arrangement according to claim 14, wherein said controlled switch is operative to terminate coupling of said digital communication signal having said protection channel substitution signaling information to said back-up channel, and couple in its place said selected one of said plurality of principal data transport channels to said back-up channel.

16. The arrangement according to claim 13, wherein said prescribed data transport framing format corresponds to extended super frame (ESF) framing format, and wherein said protection channel substitution signaling information is contained within a facility data link (FDL) portion of said ESF framing format.

17. The arrangement according to claim 16, wherein said framing generator is operative to controllably generate said digital communication signal, by selectively generating said digital communication signal having said ESF framing format, in response to need for replacement of said selected one of said plurality of principal data transport channels by said back-up channel.

* * * * *

UNITED STATES PATENT AND TRADEMARK OFFICE
CERTIFICATE OF CORRECTION

PATENT NO. : 7,203,159 B2  Page 1 of 1
APPLICATION NO. : 10/167012
DATED : April 10, 2007
INVENTOR(S) : Dennis B. McMahan and Bradley D. Tidwell It is certified that error appears in the above-identified patent and that said Letters Patent is hereby corrected as shown below:

On the title page item (54) and col. 1, line 1,

Delete Title:

"LINE CARD-SOURCED ESF FRAMING PROTECTION SWITCH FDL SIGNALING"

Insert Corrected Title:

--LINE CARD-SOURCED ESF FRAMING FOR PROTECTION SWITCH FDL SIGNALING--

Signed and Sealed this

Fifth Day of June, 2007

JON W. DUDAS
*Director of the United States Patent and Trademark Office*